Sept. 5, 1950

H. J. VAN BEEK

CIRCUIT FOR DELAYED AUTOMATIC AMPLIFICATION CONTROL

Filed May 4, 1946

2,521,493

HERMANUS JOSEPHUS VAN BEEK
INVENTOR.

BY Fred M. Vogel

AGENT.

Patented Sept. 5, 1950 2,521,493

UNITED STATES PATENT OFFICE 2,521,493

CIRCUIT FOR DELAYED AUTOMATIC AMPLIFICATION CONTROL

Hermanus Josephus van Beek, Eindhoven, Netherlands, assignor, by mesne assignments, to Hartford National Bank and Trust Company, Hartford, Conn., as trustee Application May 4, 1946, Serial No. 667,247
In the Netherlands August 21, 1941

Section 1, Public Law 690, August 8, 1946
Patent expires August 21, 1961

5 Claims. (Cl. 179—171)

The present invention relates to automatic amplification control and more particularly to delayed automatic amplification control for radio receivers.

The use of an automatic amplification control in radio-receivers has a dual object, first compensating variations in intensity brought about during the reception by fading effects, and second maintaining constant the output energy of the receiver in a manner unchanging with the field intensity of the various transmitters.

During the reception of very weak signals there is no need of a control having the second characteristic mentioned above while, moreover, it is generally undesirable to further attenuate the signals which are already weak by compensation as mentioned above. In modern receivers therefore use is generally made of a so-called delayed automatic volume control in which the amplification of the controlled tubes is substantially constant so long as the signal intensity lies below a definite threshold value, whereas at a signal intensity which surpasses this threshold value the amplification of the controlled amplifying tubes is decreased as the signal intensity increases in such manner that the mean output energy of the circuit remains at least approximately constant.

Such an amplification control may be obtained by means of a control voltage which is derived from the received signal and which varies as a function of the signal intensity, as is shown in Fig. 1. In this figure, the signal intensity is designated $E_s$ and the control voltage derived therefrom $E_R$. For values located between O and A a control voltage is not generated; A constitutes the so-called threshold value.

In the region of the signal intensities there occurs in practice may be divided into three parts, viz. a region of low signal intensities in which a control is not desirable, a region of very high signal intensities (originating from proximate transmitters) in which substantially no fading occurs, so that only the second object of the automatic amplification control which is mentioned above plays a part. There also occurs in intermediate region of mean signal intensity in which the compensation of fading effects is the main object of the automatic amplification control. In the region of high signal intensities a greatly effective volume control is desirable for maintaining the output energy at different values of the signal intensity approximately constant in a definite position of the hand volume-control device whereas in the region of the mean signal intensity such a greatly effective volume control is not desirable in view of the so-called selective fading. When selective fading occurs and the frequency for which the fading occurs varies with time, the fading frequently occurs only for the frequency of the carrier-wave of a received signal, whereas the side-bands remain unattenuated. If, now, due to the decrease of the carrier-wave amplitude, the amplification of the controlled tubes were brought at maximum value, then the amplitudes of the side-bands would be excessively increased, with the result that an inadmissible overload of the receiver would occur.

In view thereof it has previously been proposed to make the automatic volume control less effective so that the difficulty which occurs with the selective fading is obviated, but then the second object of the control mentioned above is thus attained much less satisfactorily.

The principle object of the present invention is to provide a circuit in which the above-mentioned drawbacks which may occur with selective fading are avoided, while also a substantially constant output energy at high signal intensity is obtained.

Further objects of the invention will appear from the following description.

According to the invention, to this end a control voltage variable with the intensity of the signal to be transmitted, jointly with a substantially constant positive bias, is supplied to a control electrode of one or more of the tubes to be controlled, while the cathode lead of each of the tubes concerned includes an additional resistance of such value that the said positive bias at low signal intensity is compensated by the voltage drop in the resistance.

In order that the invention may be more clearly understood and readily carried into effect, it will be described more fully by reference to the accompanying drawing in which.

Figure 1:
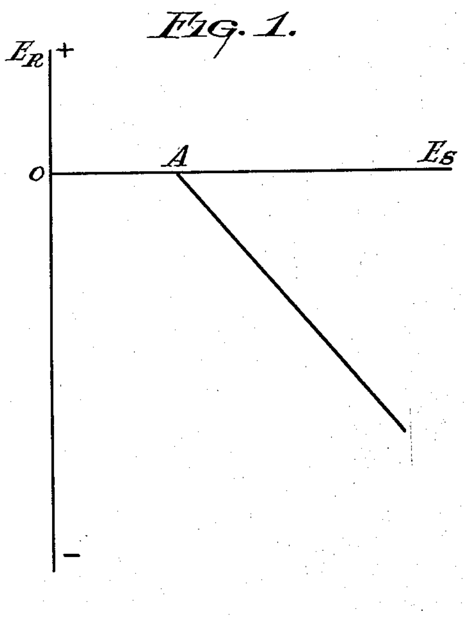
Fig. 1 shows a control voltage signal voltage characteristic.
Figure 2:
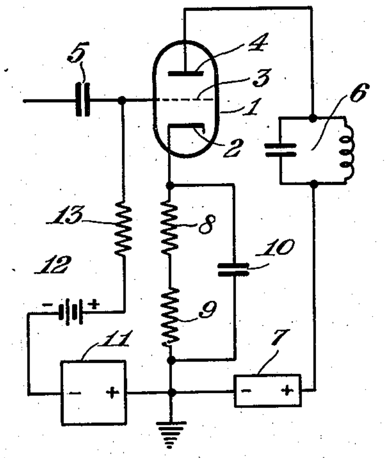
Fig. 2 shows a control amplifier circuit arrangement according to the invention.

Fig. 2 shows a part of a radio-receiver in which use is made of the invention. The oscillations to be amplified are supplied to a control grid 3 of an amplifying tube 1 through a condenser 5, which oscillations may originate, for example, from a preceding intermediate-frequency amplifier. The anode 4 of the tube 1 is connected, via an output circuit 6, to a source 7 of anode voltage whose negative terminal is earthed. The conductor which connects the cathode 2 to earth includes in the usual manner a resistance 8 which generates the required maximum grid-bias. In series with this resistance is included a second resistance 9, the operation of which will be explained later. The two resistances 8 and 9, which may alternatively be replaced by a single resistance having a value equal to the sum of the resistances 8 and 9, are bridged by a condenser 10. A device 11 supplies a control voltage which is variable with signal intensity in a manner shown by the curve of Fig. 1. The positive terminal of this device is earthed and the negative terminal is connected to the control grid 3 via a source of supply 12 and a resistance 13, the positive terminal of the source of supply 12 being located on the side of the control grid 3.

The operation of this device is as follows: It is assumed that the characteristic curve of tube 1 is such that the mutual conductance decreases when the negative grid-bias increases. When the signal intensity has a value which is located between O and A, the device 11 does not supply a control voltage so that the grid 3 acquires a positive voltage with respect to earth, which voltage is equal to the voltage supplied by the source 12. In the cathode circuit the resistances 8 and 9 are traversed by the cathode current, the value of the resistance 9 being such that the voltage drop which occurs across this resistance is exactly equal to the voltage supplied by the source 12. The grid 3 will consequently assume a negative voltage with respect to the cathode, of which the value is determined by the voltage drop across the resistance 8. The latter has such a value that under these conditions the tube operates on the steepest part of the characteristic curve and consequently gives maximum amplification.

Figure 3:
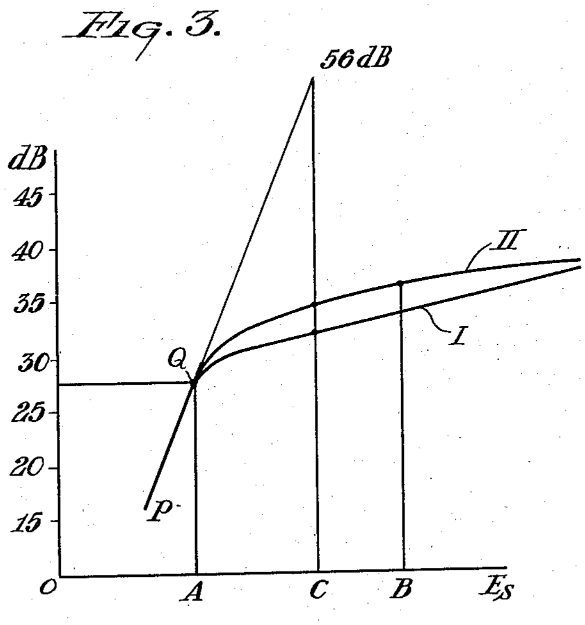
Fig. 3 shows curves of amplifier output energy as a function of signal voltage.

However, as soon as the signal intensity surpasses the value A, the device 11 supplies a control voltage which renders the grid 3 more negative with respect to the cathode 2. This results in a decrease of the cathode current and hence a decrease of the voltage drop across the resistance 9, so that the voltage supplied by the source 12 is compensated to a less extent and the negative grid-bias consequently increases to a less extent than would have been the case due to the device 11 alone. Consequently, the automatic amplification control does not become fully active. When the signal intensity further increases and tube 1 is consequently adjusted more and more in the curved part of the characteristic curve, the cathode current decreases more and more with an increasing negative grid-bias, so that the control voltage supplied by the device 11 becomes more and more effective. At last, a substantially constant value of the cathode current is attained so that the control voltage supplied by the device 11 becomes fully active. The foregoing is shown graphically in Fig. 3.

In this figure, the curve I shows the variation of the output energy measured in dbs. of an amplifier having delayed automatic amplification control as a function of the input voltage $E_s$, if the control voltage varies as shown in Fig. 1, use being made of a usual circuit comprising one controlled tube of the type ECH21. The curve II shows the variation of the output energy in dbs. if use is made of a circuit according to the invention. It appears from the variation of the two curves that, if the input voltage from O to A increases by 40 microvolts, a control does not take place. The curve I further shows that for amplitudes of $E_s$ larger than A the control almost immediately becomes fully active. When a station is received the carrier-wave amplitude of which surpasses the threshold value A and has a value corresponding to C (1000 microvolts), the output energy will amount to 32 dbs. If the carrier-wave voltage falls below the value A, for example due to selective fading, whereas the intensity of the side-bands remains unvaried, the amplification will become maximum again so that the output energy of the side-bands is determined by the slope of the line PQ and will increase by about 24 dbs.

If, however, use is made of a circuit according to the invention the process is as follows: For an increase of $E_s$ of 10,000 microvolts from A to B, a certain control takes place. In this example, with an increase of the input voltage from 40 to 10,000 microvolts, that is to say of about 68 dbs., the output energy increases from 28 to 37 dbs., that is by 9 dbs. For signal intensities higher than B the control is very effective and with an increasing input voltage the output voltage remains substantially constant. In practice such a variation of the control characteristic curve becomes manifest as follows. Low signals are amplified with maximum intensity, high signals give an output voltage which is almost constant with signal intensity, whereas for the region of moderately strong signals, which is located between A and B, large variations in signal intensity give a comparatively small variation in the output voltage. When a station is received of which the carrier-wave amplitude has a value such as C, the output energy will be equal to a value of 35 dbs. If, for example due to selective fading, the carrier-wave amplitude falls below the value A, whereas the side-bands remain at normal intensity, in this case a decrease of the amplification will not occur, but now the intensity of the side-bands will increase by a little less than 21 dbs., that is more than 3 dbs. less than in the previous case. In other words the side-bands give only half of the output energy which would occur in the known circuit. From this it appears that the invention provides an important improvement.

The additional source of supply, which is indicated by 12 in Fig. 2, may be obtained in a very simple manner if for the obtainment of the control voltage use is made of the circuit described in detail below in which an impedance is connected in parallel with a control rectifier which has supplied to it the oscillations to be transmitted, said impedance comprising the series connection of at least a smoothing resistance and a second rectifier, the second rectifier being also included in a circuit which comprises a source of supply and a second resistance. The operation of such a device has been described in detail in Dutch patent application No. 82,630 corresponding to U. S. patent application Serial No. 195,009, filed March 10, 1938, now U. S. Patent 2,200,049 issued to Carel Jan van Loon on May 7, 1940. In this case the control voltage, jointly with the constant positive direct voltage, may be derived between the cathode of the second rectifier and a tapping of the second resistance.

Figure 4:
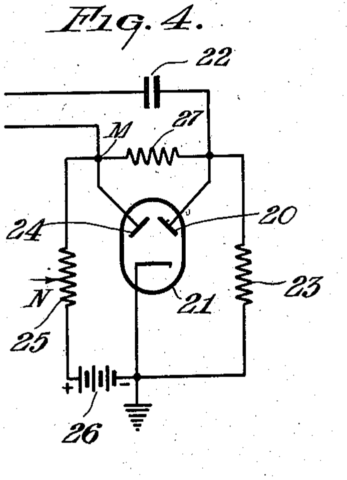
Fig. 4 shows a suitable circuit arrangement for obtaining a control voltage.

Fig. 4 shows a constructional example thereof. One of the anodes 20 of a duo-diode 21 has the signal voltage to be transmitted supplied to it via a condenser 22. This voltage may originate, for example, from the intermediate-frequency amplifier of a superheterodyne receiver. The rectifying action of the diode 20 produces across a resistance 23 a direct voltage which is proportional to the amplitude of the alternating voltage supplied to the anode 20. The second anode 24 is connected on the one hand via a resistance 25 to the positive terminal of a source of supply 26 and on the other hand via smoothing resistance 27 to the anode 20. So long as the alternating voltages set up at the anode 20 are small, the negative voltage across the resistance 23, which is supplied to the anode 24 across the resistance 27, will be smaller than the positive voltage originating from the source 26. Consequently, the diode 24 is conductive and point M is placed approximately at earth potential. If the amplitude of the signal voltage supplied to the anode 20 increases, the anode 24 becomes negative with respect to the cathode at a definite threshold value. The resistance of the diode space 24 is then high and point M may have taken from it a negative voltage which is proportioned to the signal voltage supplied to the anode 20. The control voltage thus obtained exhibits the variation which is shown by the curve of Fig. 1.

If the control voltage is not derived from point M, but from a suitably chosen tapping N of resistance 25, then substantially the same control voltage is obtained, a definite positive direct voltage substantially invariable with the input alternating voltage being added, however, so that this control voltage may be directly connected to the extremity, remote from the grid 3, of the resistance 13 in Fig. 2.

In a receiver comprising a plurality of controlled tubes, as is usually the case in superheterodyne receivers, the desired control characteristic curve may frequently be obtained by applying the circuit according to the invention to one only of the controlled tubes. It is then preferable that the high-frequency and the intermediate-frequency amplifying tubes should be controlled in the usual manner, that is to say, for example, to supply to their grids a control voltage which is taken off from point M in Fig. 4, and to control only the mixing tube by means of a circuit according to the invention by supplying to the grid thereof a control voltage which is taken off from point N. The possibility of cross-modulation is thus greatly reduced, since, due to the form of the characteristic curve which is required in view of the obtainment of a high mutual conductance, the mixing tube often produces cross-modulation. If the desired variation of the control characteristic curve may be obtained by applying the invention to only one of the controlled stages it is consequently desirable to use therefor the mixing tube, since this tube is then controlled over a considerable portion of the control region to a less high extent than would be the case otherwise.

The various circuit elements are preferably so chosen that the value of the signal intensity at which the intensity control becomes fully active (point B of Fig. 3) at least substantially corresponds to that signal intensity above which fading phenomena are no longer to be expected.

In a practical construction of a superheterodyne receiver in which the circuit according to the invention was used only for the control of the amplification of the hexode part of the mixing tube (type ECH 21), the resistances 8 and 9 together had a value of 1000 ohms, the resistance 23 a value of 0.8 megohm, the resistance 27 a value of 1.6 megohm and the resistance 25 a value of 10 megohms. The resistance 25 was tapped at $1/20$, in such manner that the resistance between M and N amounted to 0.5 megohm. The source 26 supplied a voltage of 200 volts. By giving the resistance 25 and the voltage of the source 26 a high value, due to which the resistance 25 may be tapped at $1/20$ of its value, only $1/20$ of the control voltage is lost. If desired, the variation of the control-voltage characteristic curve may be slightly influenced by using for the source 12 in Fig. 2 is a source of supply which is not fully constant, but a source whose voltage is to a certain extent variable with the signal intensity. The source of supply of this kind which is used is, for example, the screen-grid voltage of one of the controlled tubes. If the screen-grid is fed via a series resistance, the screen-grid voltage increases with an increasing control voltage since the screen-grid current decreases. By using a source 12, whose voltage increases with an increasing control voltage, the action of the control voltage will initially be delayed still further so that the variation of the part of curve II of Fig. 3 which is located between the points corresponding to the values A and B of the signal voltage $E_s$ will initially have a steeper form.

The invention may also advantageously be used in low-frequency amplifiers having automatic contrast compression, such as is used in the recording of sound on gramophone records and in radio transmitters.

The variations in intensity which may be recorded on a gramophone record or are permissible in normal modulation of a carrier-wave are limited by various factors to 30 to 40 dbs. These permissible variations in intensity are much smaller than those which may occur in an actual musical performance and which may amount to 60 to 70 dbs., so that the voltage supplied by the microphone must be compressed, which may be effected either by hand or by means of a so-called compression amplifier. In this case it is advisable that the weakest passages should comparatively be amplified most and the intermediate region to a less extent, the strongest passages having to be sharply limited. A control characteristic according to curve II of Fig. 3 fully answers these requirements so that the invention may very advantageously be used also for this purpose.

I claim:

1. A delayed automatic gain control circuit arrangement for a signal amplifier, comprising an electron discharge amplifier tube having cathode, grid and anode electrodes to which normal operating potentials are applied, comprising means to apply a signal to the grid of said tube, means to produce a control voltage proportional to the amplitude of said signal above a predetermined amplitude, a source of positive bias potential, means coupled to the anode-cathode path of said tube to produce a second direct potential at amplitudes of the applied signal below said predetermined amplitude, said second potential having a value equal to said positive bias potential, and means to apply said positive bias potential, said second direct potential in opposition thereto and said control voltage between the grid and the cathode of said amplifier tube.

2. A delayed automatic gain control circuit arrangement for a signal amplifier, comprising an electron discharge amplifier tube having cathode, grid and anode electrodes to which normal operating potentials are applied, ...

ating potentials are applied, comprising means to apply a signal to the grid of said tube, means to produce a control voltage proportional to the amplitude of said signal above a predetermined amplitude, a source of positive bias potential, a resistor interposed in the anode-cathode path of said tube to derive a second direct potential proportional to the amplitude of said signal at amplitudes of the applied signal below said predetermined amplitude, said second potential having a value equal to said positive bias potential, and means to apply said positive bias potential, said second direct potential in opposition thereto and said control voltage between the grid and the cathode of said amplifier tube.

3. A delayed automatic gain control circuit arrangement for a signal amplifier, comprising an electron discharge amplifier tube having cathode, grid and anode electrodes to which normal operating potentials are applied, comprising means to apply a signal to the grid of said tube, means to produce a control voltage proportional to the amplitude of said signal above a predetermined amplitude, a source of positive bias potential, a resistor interposed in the anode-cathode path of said tube to produce a second potential at amplitudes of the applied signal below said predetermined amplitude, said second potential having a value equal to the bias potential required for maximum gain of said tube under said normal operating potentials plus said positive bias potential, and means to apply said positive bias potential, said second direct potential in opposition thereto and said control voltage between the grid and the cathode of said amplifier tube.

4. A delayed automatic gain control circuit arrangement for a signal amplifier, comprising an electron discharge amplifier tube having cathode, grid and anode electrodes to which normal operating potentials are applied, comprising means to apply a signal to the grid of said tube, means to produce a control voltage proportional to the amplitude of said signal above an amplitude at which fading phenomena substantially disappear and having a positive bias component, a resistor interposed in the anode-cathode path of said tube to produce a second direct potential proportional to the amplitude of said signals at amplitudes of the applied signal below said amplitude at which fading phenomena disappear, said second potential having a value equal to the bias potential required for maximum gain of said tube under said normal operating potentials plus the value of said positive bias component, and means to apply said control voltage and said second direct potential in opposition to said positive bias component between the grid and cathode of said amplifier tube.

5. A delayed automatic gain control circuit arrangement for a superheterodyne radio receiver, comprising an electron discharge mixer tube having cathode, input grid and anode electrodes to which normal operating potentials are applied, comprising means to apply a signal to the input grid of said tube, means to produce a control voltage proportional to the amplitude of said signal above a predetermined amplitude and having a positive bias component, a resistor interposed in the anode-cathode path of said tube to produce a second direct potential at amplitudes of the applied signal below said predetermined amplitude, said second potential having a value equal to the bias potential required for maximum gain of said tube under said normal operating potentials plus said positive bias potential, and means to apply said positive bias potential, said second direct potential in opposition thereto and said control voltage between the input grid and the cathode of said mixer tube.

HERMANUS JOSEPHUS VAN BEEK.

REFERENCES CITED

The following references are of record in the file of this patent:

UNITED STATES PATENTS

| Number | Name | Date |
|---|---|---|
| 1,985,914 | Carlson | Jan. 1, 1935 |
| 2,026,357 | Perkins | Dec. 31, 1935 |
| 2,172,160 | Dome | Sept. 5, 1931 |
| 2,200,049 | Van Loon | May 7, 1940 |